US008019131B2

(12) United States Patent
Wong et al.

(10) Patent No.: US 8,019,131 B2
(45) Date of Patent: Sep. 13, 2011

(54) AUTHENTICATION APPARATUS AND METHOD, AND ELECTRONIC DEVICE USING THE SAME

(75) Inventors: Shih-Fang Wong, Taipei Hsien (TW); Wen-Haw Tseng, Taipei Hsien (TW); Yu Zheng, Shenzhen (CN); Guo-Qiang Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 957 days.

(21) Appl. No.: 11/946,848

(22) Filed: Nov. 29, 2007

(65) Prior Publication Data

US 2008/0253624 A1 Oct. 16, 2008

(30) Foreign Application Priority Data

Apr. 13, 2007 (CN) .......................... 2007 1 0200454

(51) Int. Cl.
*G06K 9/00* (2006.01)
*G06K 9/68* (2006.01)
(52) U.S. Cl. ...................................... 382/124; 382/218

(58) Field of Classification Search .................. 283/68, 283/69; 340/5.8, 5.83; 902/3; 382/115, 382/124, 209, 218
See application file for complete search history.

(56) References Cited

U.S. PATENT DOCUMENTS

| 5,603,179 | A | * | 2/1997 | Adams ......................... 42/70.08 |
| 6,141,436 | A | * | 10/2000 | Srey et al. .................... 382/124 |
| 6,798,335 | B2 | * | 9/2004 | Miyashita et al. ........... 340/5.53 |
| 6,941,462 | B1 | | 9/2005 | Tsukamura et al. |
| 6,944,773 | B1 | | 9/2005 | Abrahams |
| 6,950,541 | B1 | | 9/2005 | Setlak et al. |
| 7,242,277 | B2 | * | 7/2007 | Minemura ................... 340/5.53 |
| 7,366,497 | B2 | * | 4/2008 | Nagata .......................... 455/410 |

FOREIGN PATENT DOCUMENTS

CN 1870790 A 11/2006

* cited by examiner

*Primary Examiner* — Daniel Mariam
(74) *Attorney, Agent, or Firm* — Altis Law Group, Inc.

(57) ABSTRACT

An authentication apparatus is for authenticating a fingerprint to power up an electronic device. The authentication apparatus includes a fingerprint sensor, and a power manager. The fingerprint sensor includes a memory for storing predetermined fingerprints, a sampling module for sampling the fingerprint, and an authenticating module for comparing the fingerprint with the predetermined fingerprints to generate an electronic device power-up command. The power manager is for powering up the electronic device according to the electronic device power-up command. An electronic device using the authentication apparatus and an authentication method are also disclosed.

12 Claims, 5 Drawing Sheets

AUTHENTICATION APPARATUS AND METHOD, AND ELECTRONIC DEVICE USING THE SAME

BACKGROUND

1. Field of the Invention

The present invention generally relates to an authentication apparatus and an authentication method for sensing a user's fingerprint and authenticating the fingerprint, and particularly to an electronic device using the authentication apparatus and the authentication method.

2. Description of Related Art

Fingerprint sensing is a reliable and widely used technique for personal authentication. In particular, fingerprint authentication techniques are used in electronic devices such as desktop computers, laptop computers, industrial consoles, and so on.

For example, referring to FIG. 5, a laptop computer 10 includes a main body 12, and a display screen 14. The display screen 14 is pivotally connected to an edge of the main body 12. The main body 12 includes a keyboard 13, a touch pad 15, and a fingerprint sensor 16 for authenticating a user.

In operation, the display screen 14 is unfolded from the keyboard 12, and then the laptop computer 10 is powered up. The fingerprint sensor 16 is enabled to sense the user's fingerprint to obtain fingerprint information. The fingerprint sensor 16 compares the fingerprint information with predetermined fingerprint information stored in the laptop computer 10 to authenticate the user. If the authentication result is affirmative, an operating system (not shown) of the laptop computer 10 allows the user to log in. If the authentication result is negative, the operating system forbids the user to log in.

However, before the authentication operation, the laptop computer 10 must be powered up. Further, if the user is forbidden to log in, then the laptop computer 10 should be powered down, which is inconvenient.

Therefore, an authentication apparatus and method for an electronic device are needed in the industry to address the aforementioned deficiencies and inadequacies.

SUMMARY

An authentication apparatus is for authenticating a fingerprint to power up an electronic device. The authentication apparatus includes a fingerprint sensor, and a power manager. The fingerprint sensor includes a memory for storing predetermined fingerprints, a sampling module for sampling the fingerprint, and an authenticating module for comparing the fingerprint with the predetermined fingerprints to generate an electronic device power-up command. The power manager is for powering up the electronic device according to the electronic device power-up command. An electronic device using the authentication apparatus and an authentication method are also disclosed.

Other advantages and novel features of the present invention will become more apparent from the following detailed description of preferred embodiment when taken in conjunction with the accompanying drawings, in which:

DETAILED DESCRIPTION OF THE EMBODIMENT

Reference will now be made to the drawings to describe a preferred embodiment of the present apparatus and a preferred embodiment of the present method.

Figure 1:
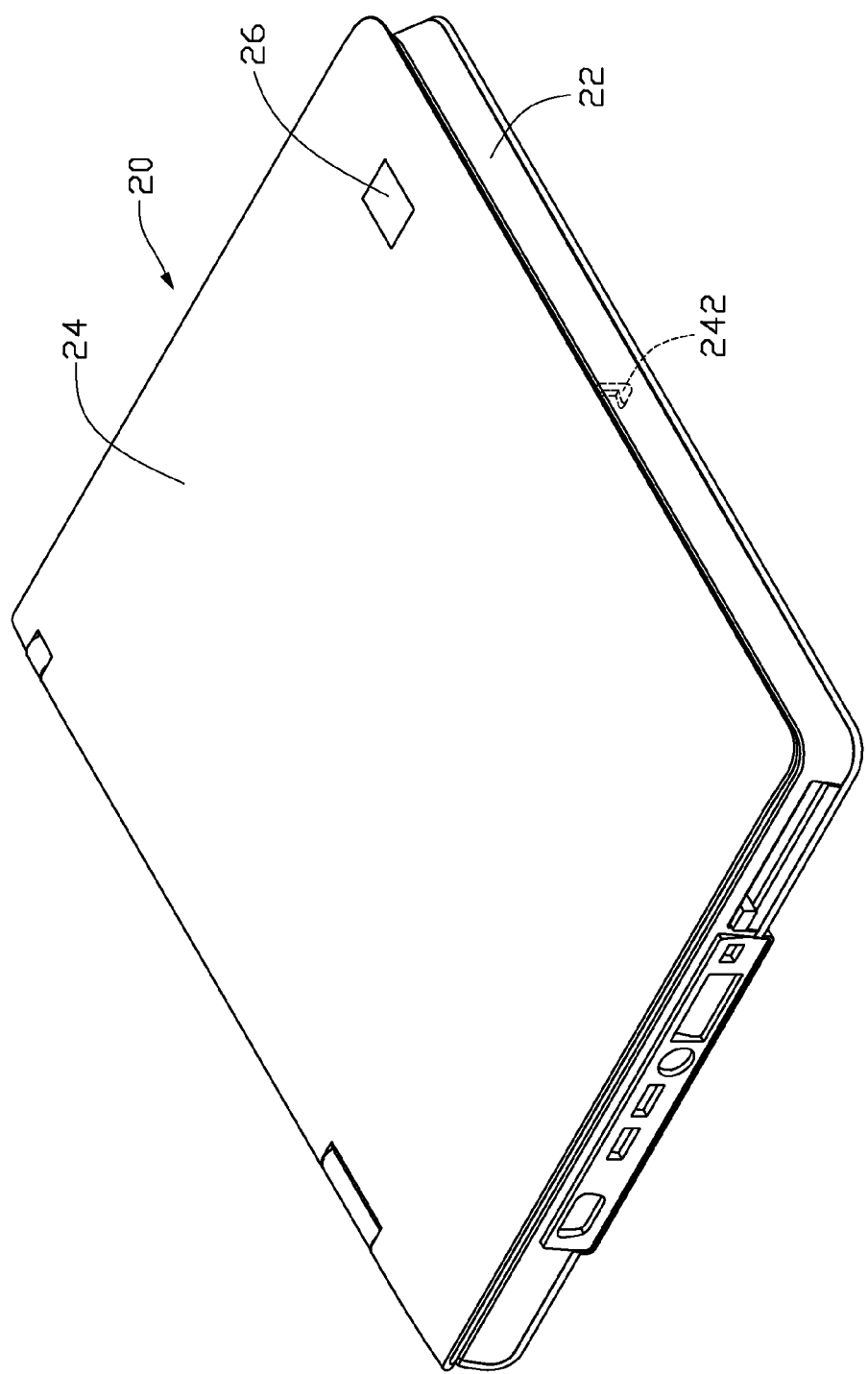
FIG. 1 is a schematic diagram showing a laptop computer including an authentication apparatus in accordance with an exemplary embodiment.
Figure 2:
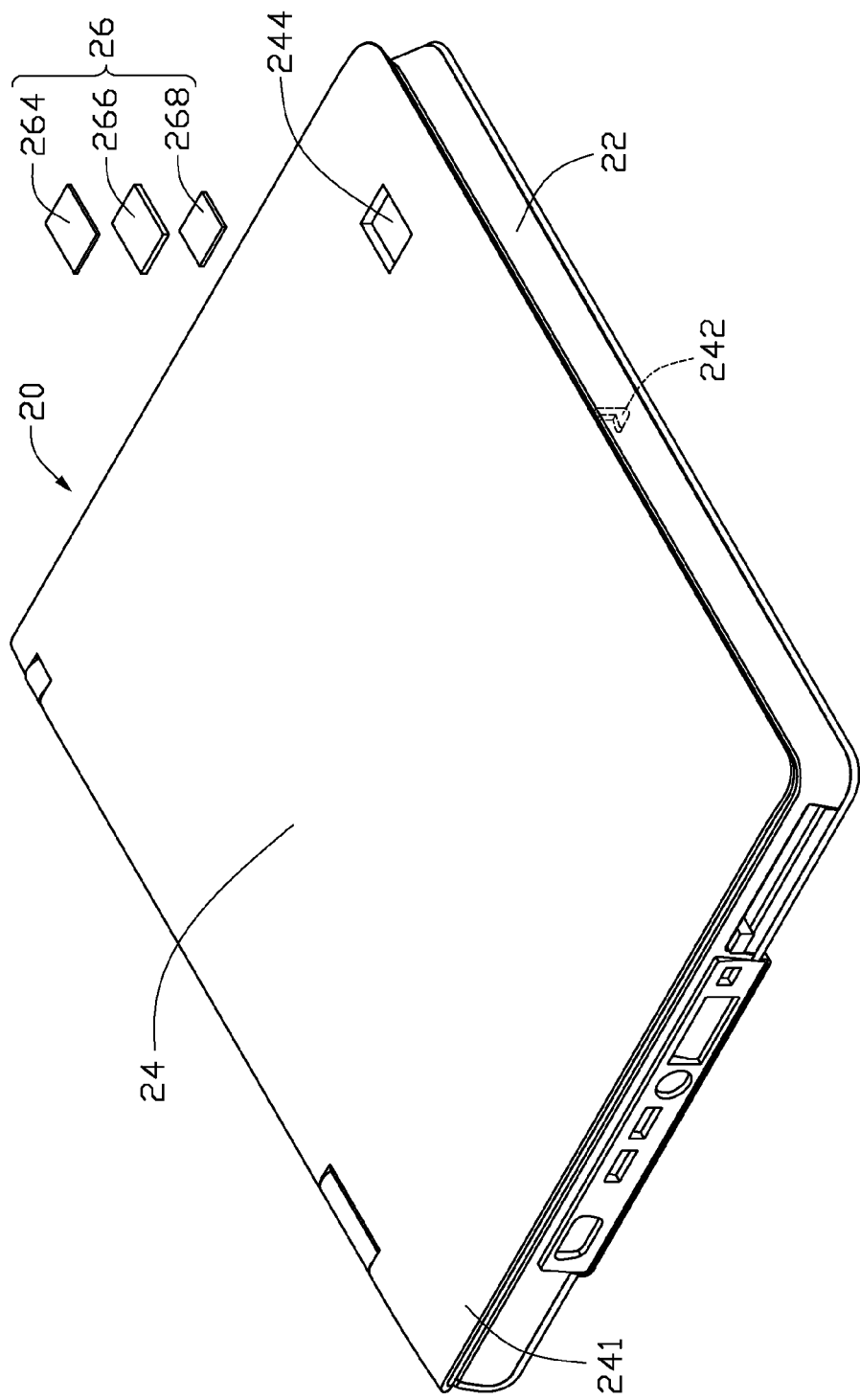
FIG. 2 is a disassembled, schematic diagram showing the authentication apparatus of FIG. 1.

Referring to FIGS. 1 and 2, a laptop computer 20 includes a main body 22, and a display screen 24 in accordance with a preferred exemplary embodiment. The display screen 24 is pivotally connected to an edge of the main body 22. The main body 22 accommodates main components such as a motherboard, a hard disk, a keyboard, and so on. The display screen 24 is for displaying information received from the main body 22.

The display screen 24 can be folded and locked over the main body 22, and can also be unlocked and unfolded from the main body 22. The display screen 24 includes an authentication apparatus 26 for authenticating a fingerprint, and an electronic lock 242 for locking the display screen 24 to the main body 22. The authentication apparatus 26 is fixed in an outside wall 241 of the display screen 24.

A recess 244 is defined in the outside wall 241 of the display screen 24. The authentication apparatus 26 is received in the recess 244. The authentication apparatus 26 includes a cover 264, a fingerprint sensor 266, and a switch 268 arranged in turn from an exterior to a bottom of the recess 244. The cover 264 is for protecting the fingerprint sensor 266 from dust and scratches. The switch 268 is for sensing pressure applied by a fingertip to generate a sensor power-up command, to power up the fingerprint sensor 266. The fingerprint sensor 266 is for sensing a fingerprint of a user, and authenticating the fingerprint and generating a device, or in this case, a laptop power-up command according to the authentication result, to open the electronic lock 242, and power up the laptop computer 20. In the preferred embodiment, the switch 268 is a pressure transducer and set beneath the fingerprint sensor 266. In other embodiments, the switch 268 can be set in other places as long as the switch 268 can receive a power up command from the user, such as by sensing an applied pressure as the power up command, or sensing illumination as the power up command.

In operation, when a fingertip of a user presses the cover 264, the switch 268 senses pressure and turns on to power up the fingerprint sensor 266. The fingerprint sensor 266 senses the fingerprint of the fingertip, and authenticates the fingerprint. When the authentication result is affirmative, the fingerprint sensor 266 generates the laptop power-up command. The electronic lock 242 is unlocked, and the laptop computer 20 is powered up according to the laptop power-up command. When the authentication result is negative, the fingerprint sensor 266 is powered down. Therefore, in the negative situation, the laptop computer 20 doesn't need to perform the "power up/down" steps.

Figure 3:
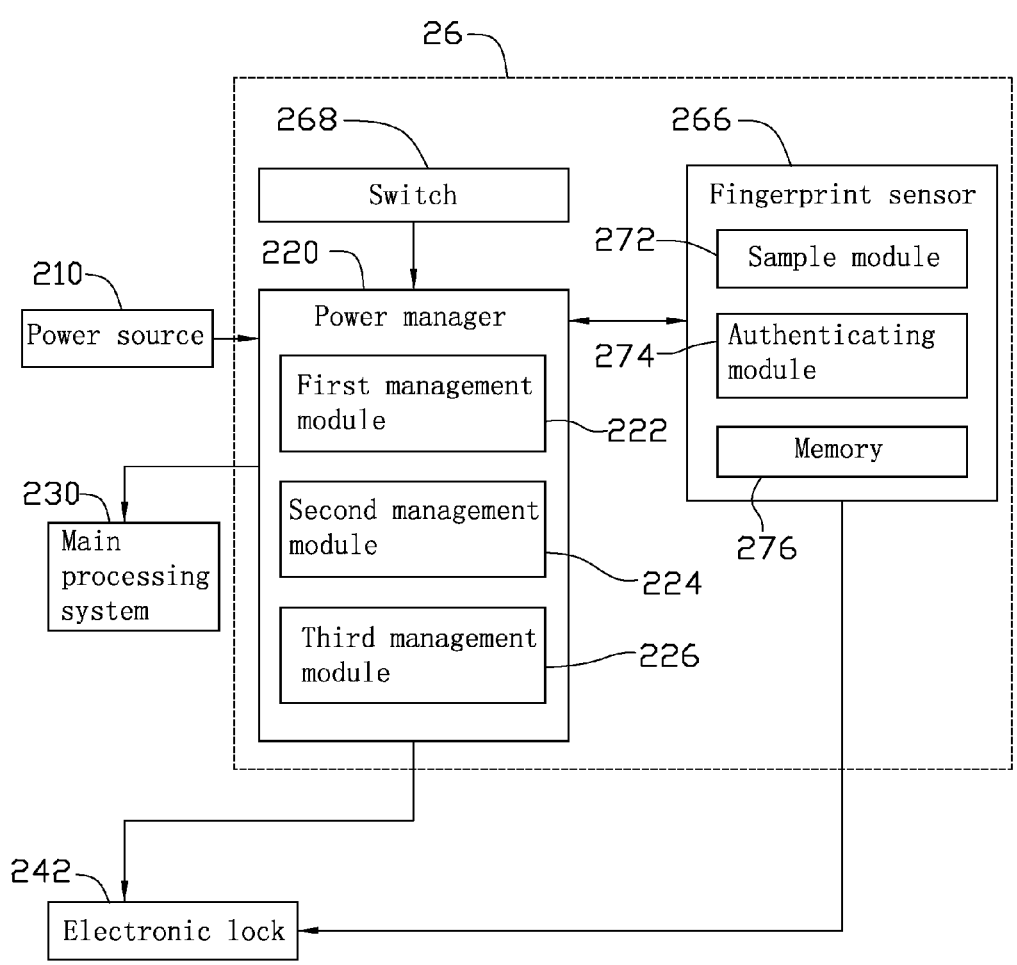
FIG. 3 is a schematic block diagram of the laptop computer of FIG. 1 and FIG. 2.

Referring to FIG. 3, a block diagram of the laptop computer 20 includes a power source 210, a main processing system 230, the electronic lock 242, and the authentication apparatus 26. The authentication apparatus 26 also includes a power manager 220.

The power source 210 is for supplying power. The power manager 220 is for receiving the sensor power-up command and the laptop power-up command, and providing power to the main processing system 230, the electronic lock 242, and the fingerprint sensor 266 according to the sensor power-up and laptop power-up commands.

The power manager 220 includes a first management module 222, a second management module 224, and a third management module 226. The first management module 222 is for receiving the sensor power-up command, and providing the power from the power source 210 to the fingerprint sensor 266 according to the sensor power-up command. The second management module 224 is for receiving the laptop power-up command, and unlocking the electronic lock 242 according to the laptop power-up command. The third management module 226 is for receiving the laptop power-up command, and providing the power from the power source 210 to the main processing system 230 according to the laptop power-up command.

The fingerprint sensor 266 includes a sampling module 272, an authenticating module 274, and a memory 276. The sampling module 272 is for sampling the fingerprint. The authenticating module 274 is for comparing the fingerprint with predetermined fingerprints stored in the memory 276 to authenticate the fingerprint. If the fingerprint is the same as one of the predetermined fingerprints, the authentication result is affirmative. If the fingerprint is not the same as one of the predetermined fingerprints, the authentication result is negative.

Furthermore, the authentication apparatus 26 can not only be used in the laptop computer 20, but also be used in other electronic devices having similar structure as the laptop computer. That is, each one of the other electronic devices also includes a power source, a power manager, a main processing system, an electronic lock, a fingerprint sensor, and a switch. Electrical connections among the components of the one of the other electronic devices are the same as those in the laptop computer 20.

Figure 4:
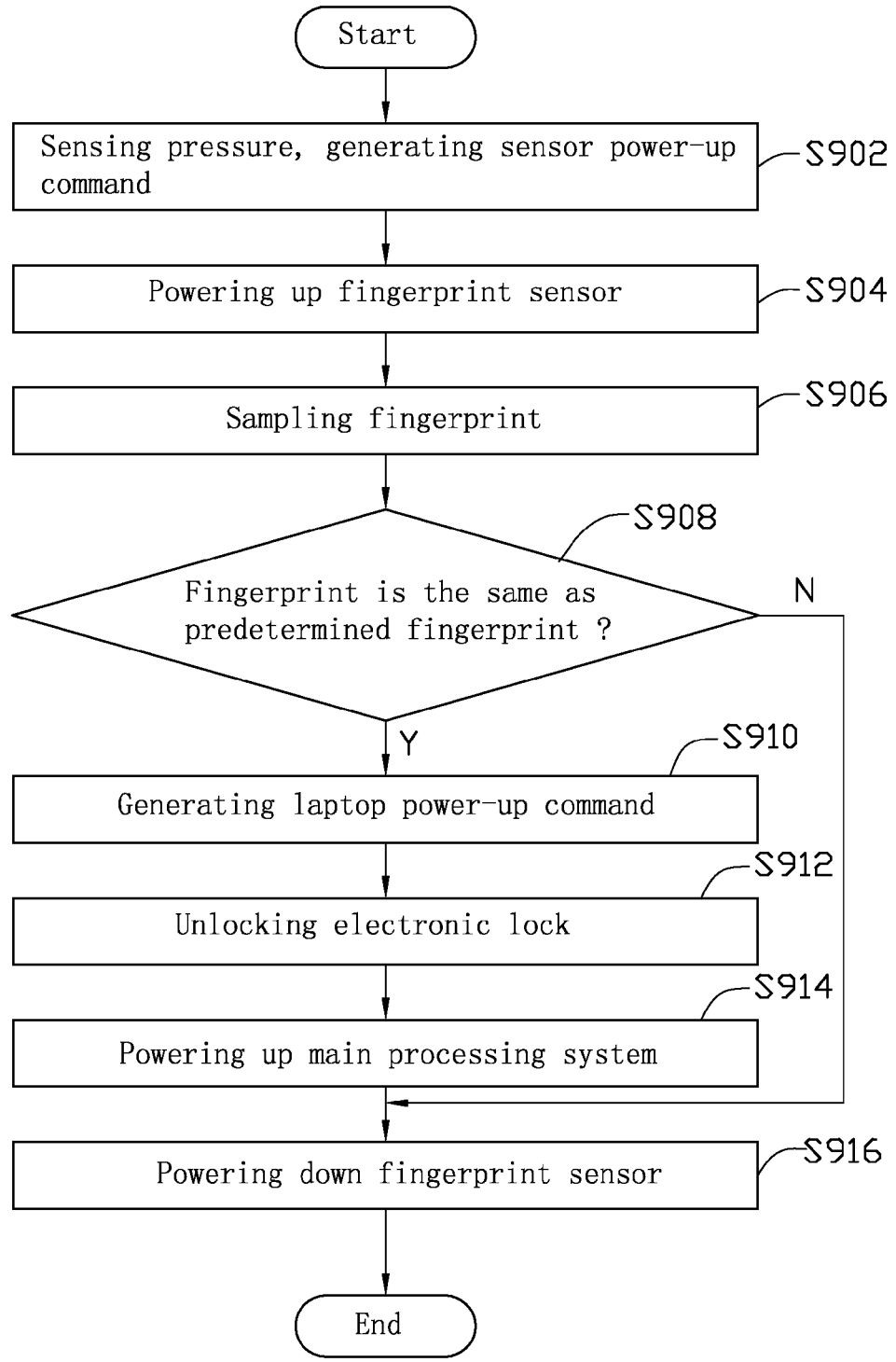
FIG. 4 is a process flow diagram illustrating an authentication method in accordance with an exemplary embodiment.
Figure 5:
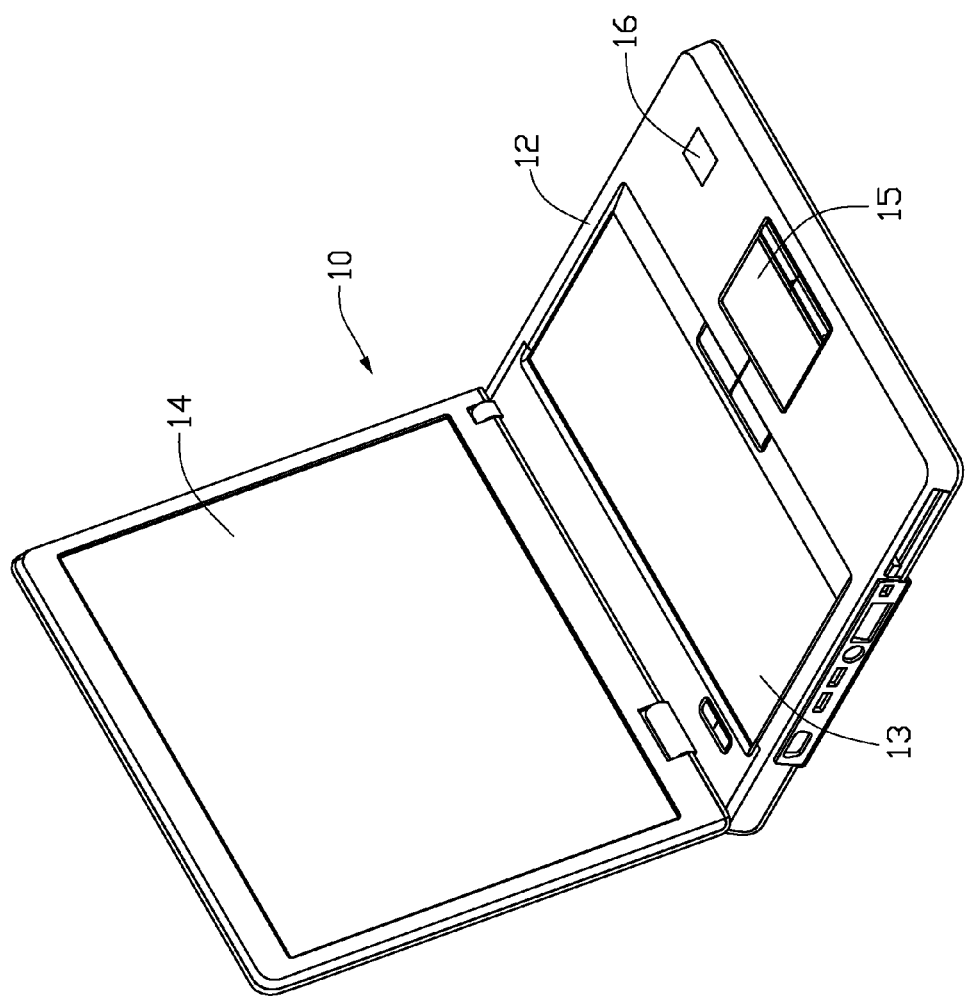
FIG. 5 is a schematic diagram showing a conventional laptop computer.

Referring to FIG. 4, a method in accordance with a preferred exemplary embodiment is for sensing a user's fingerprint and authenticating the fingerprint. A procedure of the method includes the following steps.

The switch 268 senses the pressure, and generates the sensor power-up command (step S902).

The first management module 222 receives the sensor power-up command and power, and provides the power to the fingerprint sensor 266 (step S904).

The sampling module 272 samples the fingerprint (step S906).

The authenticating module 274 compares the fingerprint with the predetermined fingerprints (step S908). If the fingerprint is the same as one of the predetermined fingerprints, the procedure goes to step S910. If the fingerprint is not the same as one of the predetermined fingerprints, the procedure goes to step S916 [f1]

If the fingerprint is the same as one of the predetermined fingerprint the fingerprint sensor 266 generates the laptop power-up command (step S910).

The second management module 224 receives the laptop power-up command, and unlocks the electronic lock 242 according to the laptop power-up command (step S912).

The third management module 226 receives the laptop power-up command and power, and provides the power to the main processing system 230 according to the laptop power-up command (step S914).

The fingerprint sensor 266 is powered down (step S916).

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. An electronic device comprising:
a first portion;
a second portion pivotally connected to the first portion;
a power source for supplying power;
a main processing system;
a fingerprint sensor for authenticating a fingerprint to generate an electronic device power-up command;
an electronic lock being arranged to lock the second portion to the first portion such that the second portion being folded and locked over the first portion, and being unlocked in response to the electronic device power-up command such that the second portion is unfolded from the first portion; and
a power manager for providing the power from the power source to the main processing system according to the electronic device power-up command.

2. The electronic device according to claim 1, further comprising a switch for sensing pressure to generate a sensor power-up command, and a first management module for providing the power from the power source to the fingerprint sensor in response to the sensor power-up command.

3. The electronic device according to claim 2, wherein the display screen comprises an outside wall, and a recess is defined in the outside wall for receiving the fingerprint sensor.

4. The electronic device according to claim 3, further comprising a cover for protecting the fingerprint sensor.

5. The electronic device according to claim 4, wherein the cover, the fingerprint sensor, and the switch are arranged in turn in the recess from an exterior to a bottom of the recess.

6. The electronic device according to claim 1, wherein the first portion is a main body and the second portion is a display screen for displaying information from the main body, and the display screen is pivotally connected to an edge of the main body.

7. The electronic device according to claim 1, further comprising power manager for unlocking the electronic lock according to the electronic device power-up command.

8. The electronic device according to claim 1, wherein the fingerprint sensor comprises a memory for storing predetermined fingerprints, a sampling module for sampling the fingerprint, and an authenticating module for comparing the fingerprint with the predetermined fingerprints to generate the electronic device power-up command.

9. The electronic device according to claim 8, wherein if the fingerprint is the same as one of the predetermined fingerprints, the electronic device power-up command is generated, and if the fingerprint is not the same as one of the predetermined fingerprints, the fingerprint sensor is powered down.

10. An authentication method for authenticating a fingerprint used by an electronic device, the electronic device comprising a first portion, and the second portion pivotally connected to the first portion, and an electronic lock being arranged to lock the second portion to the first portion such that the second portion being folded and locked over the first portion; the authentication method comprising:

sampling the fingerprint;

comparing the fingerprint with predetermined fingerprints;

generating an electronic device power-up command if the fingerprint is the same as one of the predetermined fingerprints;

unlocking the electronic lock in response to the electronic device power-up command such that the second portion is unfolded from the first portion; and powering up the electronic device according to the electronic device power-up command.

11. The authentication method according to claim 10, further comprising the following steps before the step of sampling the fingerprint:

sensing pressure applied by the finger;

generating a sensor power-up command;

powering up the fingerprint sensor according to the sensor power-up command.

12. The authentication method according to claim 10, further comprising:

powering down the fingerprint sensor if the fingerprint is not the same as one of the predetermined fingerprints.

* * * * *